Figure 1:
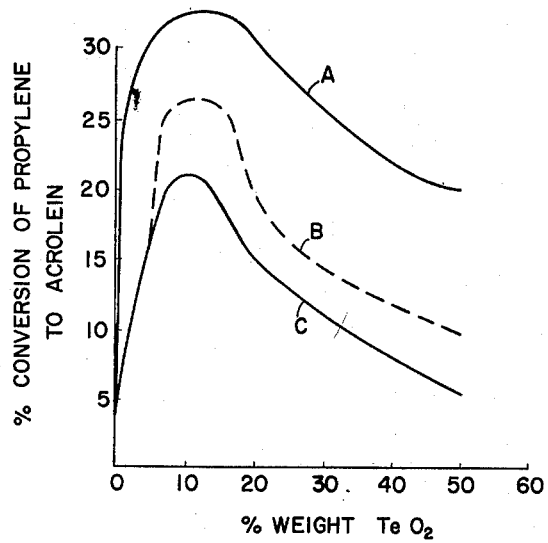
Figure 2:
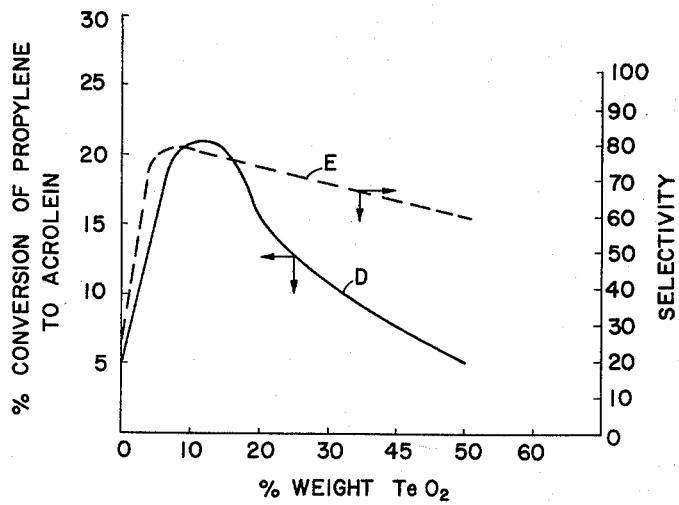

INVENTORS:
HERVEY H. VOGE
WARREN E. ARMSTRONG
BY:
THEIR AGENT 3,168,572
PRODUCTION OF ALPHA,BETA-UNSATURATED
CARBONYLIC COMPOUNDS
Hervey H. Voge, Berkeley, and Warren E. Armstrong, Lafayette, Calif., assignors to Shell Oil Company, New York, N.Y., a corporation of Delaware
Filed Oct. 6, 1961, Ser. No. 143,434
2 Claims. (Cl. 260—604)

This invention relates to the production of alpha,beta-unsaturated carbonylic compounds by the controlled, incomplete, catalytic oxidation of olefinic hydrocarbons with molecular oxygen. The invention relates more particularly to improvements in the production of alpha,beta-unsaturated aliphatic aldehydes by catalytic vapor phase oxidation of corresponding olefinic hydrocarbons.

Processes have been disclosed heretofore directed to catalytic oxidation of olefins in the vapor phase to oxidation products comprising alpha,beta-unsaturated carbonylic compounds, such as alpha,beta-unsaturated aliphatic aldehydes. Many catalytic materials have been disclosed as capable of influencing to varying degrees this reaction; individual materials often being characterized by behavior, with respect to effect on operating conditions of the process, which distinguish them markedly from other catalysts for the reaction. Thus, their effectiveness will vary with respect to temperature, composition of reactants, type of materials of construction in contact with them during reaction conditions, etc. Oxidation catalysts which, because of certain specific characteristics, have been considered heretofore as suitable for use in the catalytic oxidation of olefins to alpha,beta-unsaturated carbonylic compounds include oxides of metals, such as molybdenum, chromium and tungsten. These materials catalyze to varying degrees oxidation reactions. They are rugged, readily available and compatible with most materials of construction under oxidation conditions generally employed. A feature distinguishing them from certain other oxidation catalysts is their relative ability to exert a desirable catalytic effect over wide ranges of variations in feed composition in the catalytic oxidation of olefins. Their use in the catalytic oxidation of olefins to corresponding alpha,beta-unsaturated aliphatic aldehydes is, however, handicapped by relatively low conversions to the desired product, high production rates to unwanted by-products and lack of uniformity with respect to behavior under operating conditions. These and other difficulties often inherent in their use have rendered these materials generally unsuitable for practical scale application to the oxidation of olefins to alpha,beta-unsaturated carbonylic compounds.

To render these specific materials more suitable as catalysts for use in the production of the unsaturated carbonylic compounds from olefins it has been proposed to combine them with other metals and metalloids capable of altering to some degree their behavior characteristics toward the desired oxidative conversion of olefins to unsaturated products. Certain of these combinations have been found to be highly effective. However, their suitability for practical scale operation is often offset by their complexity, and consequently the cost of their production with the essential degree of uniformity and ruggedness generally required.

It is, therefore, an object of the present invention to provide an improved process enabling the more efficient production of alpha,beta-unsaturated carbonylic compounds by the catalytic vapor phase oxidation of the corresponding olefins with the aid of a Group VI metal oxidation catalyst wherein the above difficulties are obviated to at least a substantial degree.

A more particular object of the invention is the provision of an improved process enabling the more efficient production of alpha,beta-unsaturated aldehydes by catalytic vapor phase oxidation of corresponding olefins in the presence of a catalyst comprising a Group VI metal oxide.

A specific object of the invention is the provision of an improved process enabling the more efficient oxidative catalytic conversion of propylene and/or isobutylene to acrolein and/or methacrolein, respectively. Other objects and advantages of the invention will become apparent from the following detailed description thereof, made with reference to the attached drawing wherein FIGURES I and II show graphs indicating a relationship between conversion and catalyst composition in the catalytic oxidation of an olefinic hydrocarbon to the corresponding alpha,beta-unsaturated aliphatic aldehyde.

It has now been found that substantially improved catalysts for the catalytic oxidation of olefins to corresponding alpha,beta-unsaturated carbonylic compounds are obtained by combining at least one metal of the left-hand column of Group VI of the Periodic Table with a minor but critical quantity of an oxide of tellurium. Quite surprisingly it was found that, whereas the combination of an oxide of a metal from the left-hand column of Group VI with a predominant amount of an oxide of tellurium does not produce a catalyst capable of producing the unsaturated aldehydes from olefins with conversions commensurate with practical scale operation, the combination of these same Group VI metal oxides with only a minor amount of the oxide of tellurium results in a catalyst combination of outstanding activity for this reaction as reflected by conversions and selectivity. Combining the Group VI metal oxide with only a minor amount of an oxide of tellurium, but within the critical range defined herein, provides a combination catalyst of relatively simple composition, easily reproduced with uniformity, which not only retains all desirable advantages normally inherent in Group VI metal oxides as catalyst, but so modifies their effectiveness that it now brings their use in the catalysis of the oxidation of olefins to corresponding alpha,beta-unsaturated carbonylic compounds, such as the aldehydes, within an economically attractive realm.

In accordance with the process of the invention, olefins are oxidatively converted to corresponding alpha,beta-unsaturated carbonylic compounds comprising alpha,beta-unsaturated aldehydes by reacting said olefin with an oxygen-containing gas, at a temperature of from about 250° to about 600° C., in the presence of a catalyst composition comprising an oxide of a metal of the left-hand column of Group VI of the Periodic Table in combination with from about 2% to about 25% by weight of the total catalyst composition of an oxide of tellurium.

The hydrocarbon charge to the process of the invention comprises olefinically unsaturated hydrocarbons. The invention is applied with particular advantage to the oxidative conversion of normally gaseous hydrocarbons comprising propylene and/or isobutylene. Propylene reacts with oxygen to form acrolein, and isobutylene reacts with oxygen to form methacrolein, under the conditions of the presently claimed invention as defined herein. The olefins charged to the process need not necessarily be in a pure state. They may comprise materials which are in the vapor state, which do not undergo any substantial reaction and which do not adversely affect the desired olefin oxidation under the reaction conditions of the presently claimed process. A normally gaseous olefinic charge may include, in addition to an olefin such as propylene and/or isobutylene, normally gaseous paraffinic hydrocarbons, such as, for example, methane, ethane, propane, butanes, or other paraffins which are in the vapor state under the conditions at which the claimed process is executed. Suitable charge materials comprise commercially available propylene and isobutylene-containing fractions.

Addition of diluents to the hydrocarbons is, at times, advantageous. Such diluent materials function as entraining agents for the reaction mixture and aid in maintaining uniformity of reaction conditions. Other suitable olefinic charge materials comprise olefin-containing gaseous mixture produced during pyrolytic or chemical processing of hydrocarbons. Such gaseous mixtures may comprise all, or only a part, of the effluence from oxidation reactors wherein olefins, or other hydrocarbons, are subjected to thermal and/or catalytic oxidative conversions.

Oxygen-containing gas employed as source of the oxygen reactant may consist of concentrated oxygen, such as obtained, for example, by the fractionation of air; or it may consist of a more dilute molecular oxygen-containing gas. A suitable oxygen-containing gas comprises, for example, free oxygen in admixture with inert diluent gas, such as, for example, nitrogen, argon, carbon dioxide, etc. Air may be used as the source of the molecular oxygen reactant. All or a part of the oxygen-containing charge may be admixed with the olefinic charge to the system before introduction into the reaction zone, or it may be introduced directly into the reaction zone. Oxygen and/or olefinic charge may be introduced into the reaction zone at one or a plurality of points thereof. The inclusion of oxygen in the form of ozone, or as hydrogen peroxide, in the oxygen-containing gas during any part of the reaction, catalyst activation, regeneration, and the like, is comprised within the scope of the invention. Recycle gas comprising inert gases, may be enriched with make-up, concentrated oxygen before introduction into the reaction zone.

The olefinic charge is reacted with the oxygen-containing gas in the presence of a catalyst comprising at least one metal oxide selected from the oxides of metals from the left-hand column of Group VI of the Periodic Table of the elements in combination with a minor, but critical, amount of an oxide of tellurium. The suitable oxides of the metals of the left-hand column of Group VI include the oxides of molybdenum, chromium and tungsten. The catalyst may comprise one or more oxide forms of a single metal, or of two or more of the metals, of the left-hand column of Group VI. When more than one metal oxide of the left-hand column of Group VI is present, these may be present as physical admixtures of one or more oxide forms of each of the metals, or they may be present in chemical combination with oxygen and one another. Comprised are the combinations wherein two or more of the left-hand column Group VI metals are present in the form of a heteropoly acid or as admixtures of oxygen-containing acid forms thereof with simple oxides of one or more of these Group VI metals, etc.

Essential to the attainment of the objects of the invention is the presence in the catalyst of tellurium in the form of an oxide, for example, as tellurium dioxide, and in a well-defined critical concentration. The tellurium oxide content of the catalyst is maintained in the range of from about 2% to about 40%, and more preferably from about 5% to about 25%, by weight of the total catalyst. As made evident by following Examples I–IV and the graphs shown in the attached drawing relatively little olefin is converted to alpha,beta-unsaturated aldehyde in the absence of the oxide of tellurium in the catalyst. Its presence by as little as about 0.2% by weight results in a rapid rise in conversion to unsaturated aldehyde. This increase continues with increase in oxide of tellurium content of the catalyst; a maximum being reached in the region of about 5% to about 25% of tellurium oxide in the catalyst (see attached drawing). Optimum olefin conversion to alpha,beta-unsaturated aldehyde is obtained with a concentration of oxide of tellurium of from about 7.5 to about 18% of the catalyst (Examples I–IV; and attached drawing). As shown in Examples I–IV and the attached drawing, there is a rapid and continuous drop in conversion to the desired unsaturated aldehyde at tellurium oxide concentrations above about 25%, so that at concentration of tellurium oxide above about 40% by weight in the catalyst, conversions commensurate with practical scale operations are no longer obtained. When effecting the oxidative conversion of propylene and/or isobutylene, particularly preferred catalysts comprise those containing an oxide of a metal of the left-hand column of Group VI of the Periodic Table in combination with an amount of an oxide of tellurium in the range of from about 7.5 to about 18% by weight of the total catalyst composition (calculated as tellurium oxide).

The tellurium may be present in more than one oxide form in the catalyst. In general, it is present as the dioxide ($TeO_2$). The requisite critical amount of the oxide of tellurium may be present in the form of a physical admixture, and/or as a loose chemical combination, with the left-hand column Group VI metal oxide component of the catalysts. The catalysts may be obtained in any suitable manner resulting in the prescribed composition. The oxide of tellurium, for example, tellurium dioxide, may be admixed with any left-hand column Group VI metal oxide, for example, dry molybdenum oxide ($MoO_2$ or $MoO_3$), the dry mixture stirred, pelleted and used as such; or the pellets may be broken and screened to selected particle size. Use may be made of suitable carrying media in preparing the combination catalyst. Thus, the components may be dissolved, suspended, dispersed, or the like, in a suitable liquid medium and then combined. The carrying medium is thereafter removed by suitable means, for example, by one or more such steps as decantation, evaporation, filtration, centrifuging and the like. One or both components may be combined with a suitable carrying medium such as, for example, water, or any other suitable inert liquid, to form a paste before being admixed with each other. The resulting mixture is then dried and calcined. The calcination should be carefully controlled so that the temperature at no time exceeds about 550° C.

Other methods of producing the catalyst combinations comprise the combining of the left-hand column Group VI metal oxide with a compound of tellurium other than the oxide, and the subjection of the resulting mixture to conditions of temperature and/or pressure, and/or atmosphere, which will result in the conversion of the admixed tellurium compound to the oxide form. Other methods comprise the simultaneous formation of the oxide of the left-hand column Group VI metal component and of the admixed tellurium. Comprised within the scope of the invention is the formation of the tellurium oxide in situ. Thus, the Group VI metal oxide may be admixed with a compound of tellurium other than the oxide, for example, ammonium tellurate, which under the reaction conditions of the process will result in the conversion of the tellurium component to the oxide form. The tellurium component may thus be incorporated in the form of a precursor of the oxide form by treating the left-hand column Group VI metal oxide component with a gaseous stream containing the volatile tellurium hydride ($H_2Te$). Tellurium metal, tellurium nitrate, ammonium tellurite, tellurous acid, telluric acid, and still other compounds may be employed for preparation. The metal from the left-hand column of Group VI may be added as oxide, hydroxide, hydrated oxide, nitrate, acid, ammonium salt of an acid, etc. It is advantageous to use freshly prepared compounds such as oxides, hydrated oxides, or acids, since these are more reactive in catalyst formation and lead to catalysts of higher activity.

The catalyst composition may be used as such or in combination with one or more suitable support and/or solid diluents. Such suitable supports and/or diluents comprise, for example, any of the silicious and/or aluminous catalyst supports, for example, silica, alumina, silica-alumina, sintered or bonded silica, etc. Other suitable support materials comprise, for example, Alundum, crushed fire brick, bonded diatomite, pumice, ball clay, bauxite, Porocel, Aloxite, Carborundum, silicon, silicon carbide, ceramically bonded aluminous and/or silicious materials, charcoals, activated carbons, etc.

Although the essential components of the catalysts used in the process of the present invention comprise an oxide of a metal of the left-hand column of Group VI in combination with tellurium oxide, other components capable of modifying the catalyst optionally may be present in lesser amounts. Such modifiers comprise, for example, one or more of As, Sb, or Bi or oxides thereof.

The addition of tellurium, or a compound of tellurium, during the course of the process is contemplated within the scope of the invention. The addition may be periodic or continuous. If periodic, process conditions may be changed during addition. Such addition of tellurium is made in controlled amounts to assure the maintenance of the tellurium oxide content of the catalyst within the above-prescribed permissible amount within the system. The addition of the tellurium, or compound thereof, during the course of the oxidation process may be carried out by its introduction in the form of a vapor, mist, dust, smoke, or the like, into the bed of catalyst in the reaction zone. The introduction of the tellurium into the reaction zone may furthermore be effected by dissolving, or suspending, the tellurium, or a suitable compound thereof, in a suitable solvent or carrying medium before introduction into the system. The make-up tellurium may be introduced as such, as an oxide, or as a tellurium compound capable of reverting to the oxide form under the process conditions, such as, for example, tellurium hydride, ammonium tellurate, tellurium tetraiodide, tellurium nitrate, tellurium sulfur oxide, telluric acid, etc.

When, after prolonged use or "upset conditions" the catalysts used in the process of the invention have lost to some extent their activity, they may be regenerated by heating in an oxygen-containing stream, for example, air, which may be diluted with an inert gas, such as flue gas or the like, at elevated temperatures, for example, from about 500° to about 600° C. The time of such heating may vary within the scope of the invention, in general, a period of from about 0.5 to about 3 hours will be found satisfactory. Longer or shorter heating times may, however, be used within the scope of the invention. After the heating step the catalyst may be treated with tellurium, tellurium oxide or a suitable tellurium compound to assure the presence of the tellurium modifier in the regenerated catalyst in an amount within the above-defined range. Regeneration of the catalyst may be carried out in situ.

Reaction of the olefinic charge with oxygen in accordance with the invention is carried out at a temperature of from about 250° C. to about 600° C. and preferably from about 375° to about 450° C. A particular advantage of the invention resides in the ability to obtain high selectivities at substantially reduced temperatures by the use of the tellurium oxide modified catalysts.

Pressures in the range of from about atmospheric to about 85 p.s.i.g. are generally satisfactory although somewhat higher pressures, for example, up to about 250 p.s.i.g. may at times be advantageously employed. A distinct advantage of the invention resides in the ability to employ the superatmospheric pressures in the absence of any loss of catalyst activity, thereby assuring efficient use of the tellurium-modified catalyst in the form of a fixed bed. The use of atmospheric, subatmospheric or superatmospheric pressures broadly, is, however, comprised within the scope of the invention.

Contact times preferably employed may vary considerably within the scope of the invention in accordance with temperature and specific catalyst compositions used. In general, a contact time in the range of from about 0.05 to about 15 seconds may be employed. Higher or lower contact times may be used within the scope of the invention. Relatively short contact times are, however, generally preferred. The use of a contact time in the range of from about 0.1 to about 5, and preferably from about 0.2 to about 2 seconds are usually employed. Instead of contact time, gas hourly space velocity (GHSV) is often used, being defined as volumes of total gaseous feed, calculated at 0° C. and atmospheric pressure, per volume of catalyst per hour. The range of GHSV's corresponding to the above contact times is about 100–30,000 for atmospheric pressure operation.

The rate at which olefinic charge and oxygen-containing gas are fed to the reaction zone is preferably controlled to maintain a mol ratio of olefin to oxygen in the feed in the range of from about 1:0.1 to about 1:3, and preferably about 1:0.2 to 1:2. Higher or lower relative ratios of these feed components may, however, be employed within the scope of the invention. Often it is preferred to maintain a molecular excess of oxygen over the olefin in the feed to the process. A particularly preferred ratio comprises a ratio of olefin to oxygen to about 1:1.5 when employing a catalyst consisting essentially of a molybdenum-tellurium oxide combination containing from about 7.5 to about 18% by weight of the tellurium oxide.

Water vapor is preferably added to the system. Care is, however, taken to assure that no substantial amount of liquid water comes into contact with the catalyst during the operation. The water vapor may be introduced into the reaction zone in a molar proportion of water to olefin of from about 0.1:1 to about 20:1, and preferably from about 1:1 to about 5:1. Greater or lesser amounts of water vapor may, however, be introduced within the scope of the invention.

Diluents, such as normally gaseous materials, or materials which are in vapor state under conditions of execution of the reaction, and which are relatively inert and do not undergo any substantial reaction during the course of the process, may be introduced into the system. Suitable diluents comprise, for example, paraffinic hydrocarbons, flue gas, nitrogen, argon, carbon dioxide, helium, etc. Such diluent fluids are optionally introduced into the system and aid in maintaining desired conditions of temperature and contact time. Addition of heat to, or withdrawal of heat from such diluents before their introduction into the system may be resorted to within the scope of the invention.

Under the above-defined conditions olefins will react with molecular oxygen with the formation of reaction products comprising substantial amounts of the corresponding alpha,beta-unsaturated carbonylic compounds comprising substantial amounts of alpha,beta-unsaturated aldehydes corresponding to olefins charged. Thus, when charging propylene the reaction products will comprise substantial amounts of acrolein. When charging isobutylene the reaction products will comprise methacrolein. Comprised within the scope of the invention is the introduction of more than one reactive olefin to the process.

Reaction products leaving the reaction zone are sent to suitable product separating means wherein unsaturated alpha,beta-unsaturated aldehydes are separated by conventional means, comprising one or more such steps as, for example, distillation, fractionation, extractive distillation, scrubbing, absorption, adsorption, liquid-liquid extraction, etc.

The process of the invention may be carried out as a semicontinuous, a batch or a continuous operation. The catalyst may be employed in the form of a fixed bed, or in fluidized or suspended form. A particularly suitable method of operation comprises the use of the catalyst in suspended form, under conditions providing for concurrent passage of reactants and catalyst through an elongated reaction zone of restricted cross-sectional area, such as a tubular or coil reactor. When employing the catalyst in fluidized or suspended systems provision may be made for adjustment of the tellurium content of the catalyst by passing a part of recycled catalyst through a separate catalyst treating zone wherein it is subjected to suitable treatment including addition of tellurium or a compound thereof. Such treatment of the catalyst is carefully controlled to maintain the tellurium content of the catalyst in the reaction zone within the above-defined critical range. The treatment zone may be a cooler zone where recycled catalyst readsorbs volatile tellurium compounds carried by the effluent stream from the reactor proper.

A plurality of reaction zones, arranged in parallel or series flow, may be employed. Conditions may be varied within the separate reaction zones. Thus, a part or all of the effluence of one zone may be subjected to conditions of greater intensity of oxidation in a subsequent zone. Conditions may be provided in the second or subsequent zone of a plural step operation to obtain oxidation of residual olefins as well as further oxidation of unsaturated aldehydes to a higher oxidation stage, for example, to corresponding alpha,beta-unsaturated acids. Conditions employed in such second stage may comprise the use of any of the oxidation catalysts disclosed heretofore for the oxidation of an aldehydic product to a predominantly unsaturated carboxylic acid product. Oxygen may be injected into the system between individual reactors in such plural stage system. Comprised within the scope of the invention is the use of the catalyst as the oxidant, or oxygen-carrier, for the reaction. In such case relatively little or no oxygen-containing gas is introduced into the reaction zone and some reduction of the oxygen-content of the catalyst during the course of the execution of the reaction will take place. The catalyst of reduced oxygen content leaving the reaction zone is subjected to oxidizing conditions in a separate zone before return to the reaction zone. Re-oxidation of the partially reduced catalyst may be effected by subjecting the catalyst to a stream of oxygen, or oxygen-containing gas, for example, air, in such separate catalyst oxidizing zone.

Tellurium or, tellurium compounds, entrained from the catalyst with the reaction mixture leaving the reaction zone, may be separated from the reactor effluence and returned to the catalyst being used, or to be used, in the reaction. Provision may be made for avoiding any substantial entrainment of tellurium from the reaction zone. Thus, the catalyst bed may be preceded and followed by a guard section which will entrap entrained tellurium and/or tellurium compounds. The guard sections may consist of a suitable foraminous bed of solid material such as, for example, adsorptive silicious and/or aluminous materials, alumina silicia, clays, etc. When the guard section following the catalyst bed has acquired an appreciable tellurium content, flow through the system may be reversed to strip the entrapped tellurium from the guard section with the incoming feed and thus carry this catalyst component back into the catalyst bed. Operation thus proceeds with periodic reversal of flow. The guard section may also comprise a zone outside of the reaction zone through which reactor effluence is passed and from which entrapped tellurium is periodically stripped by passing incoming feed therethrough while switching flow of reactor effluence through a separate guard section. In fixed bed operations, retention of entraining tellurium catalyst component may also be obtained by simply reversing the flow periodically through the reactor.

Example I

A series of $TeO_2$—$MoO_3$ catalysts were prepared by mixing the oxide components in powder form followed by pelleting and calcining. The procedure used is exemplified by the following preparation of a 10% $TeO_2$—90% $MoO_3$ catalyst composition: A dry mixture of 15 g. $TeO_2$ and 135 g. of $MoO_3$ powder was made. The $TeO_2$ was a technical grade while the $MoO_3$ had been made by calcining molybdic acid of commerce (85% $MoO_3$) at 500° C. The dry mixture was compressed into tablets of one-inch diameter at 8,000 pounds pressure, and the tablets were calcined in air at 420° C. The calcined tablets were broken and screened to 10–20 mesh granules. $TeO_2$—$MoO_3$ combinations containing 5, 20, and 50% by weight $TeO_2$, respectively, were made in a similar manner. For comparison $MoO_3$ was prepared, both by calcination of molybdic acid (85%), and by precipitation from an ammonium molybdate solution followed by drying and calcination at 500° C. Both samples of $MoO_3$ gave the same low conversions and selectivities when used in the catalytic oxidative conversion of propylene under substantially identical conditions.

In each of a plurality of operations a gaseous mixture consisting of 13% propylene, 13% oxygen, 20% water vapor and 54% argon by volume was passed over one of the above catalysts at a temperature of about 485° C. atmospheric pressure, and a gas hourly space velocity of 1,125. The operations were carried out under substantially identical conditions but with the exception that the tellurium dioxide content of the catalysts differed from one another. The tellurium-promoted catalysts were prepared substantially by the same procedure as described above for the 10% $TeO_2$–90% $MoO_3$ catalyst. Tests were also carried out with the molybdenum oxide catalysts containing no tellurium. Propylene converted to acrolein was determined for each operation. Plotting the propylene conversion obtained against the tellurium dioxide content of the catalyst resulted in the Curve A of the FIGURE I of the attached drawing.

Example II

A series of tellurium oxide-molybdenum oxide combination catalysts varying in $TeO_2$ content was prepared in which 20% by weight $SiO_2$ was also incorporated. Preparation of this series is exemplified by the following procedure used in preparing a catalyst containing 2.8% $TeO_2$: A solution of 0.7 g. $TeO_2$ in 22 ml. of 7.8 N nitric acid was mixed with a solution of 22.7 g. molybdic acid (85% $MoO_3$) in 134 ml. 1.5 N ammonium hydroxide. There was then added 16 g. of a colloidal silica sol containing 31% by weight $SiO_2$. The resulting slurry was evaporated to dryness with stirring, and calcined in air at 420° C. for 2 hours. The hard cake was broken and sieved to 10–20 mesh granules. Other catalysts were prepared with different amounts of $TeO_2$. The catalysts of this series had the following compositions:

| | | | | | |
|---|---|---|---|---|---|
| Percent by wt. $TeO_2$ in total catalyst | 2.8 | 6.8 | 17.4 | 28.6 | 50.3 |
| Percent by wt. $TeO_2$ in $SiO_2$-free part | 3.5 | 8.5 | 21.7 | 35.7 | 62.9 |
| Mo atoms per Te atom | 30 | 12 | 4 | 2 | 0.66 |

In each of a series of operations a gaseous mixture containing 13% propylene, 13% oxygen, 20% water vapor and 54% argon by volume was passed over a bed of one of the catalysts consisting essentially of molybdenum oxide, tellurium dioxide and silica at a temperature of about 495° C., atmosphere pressure, and a gas hourly space velocity of 4,500. The operations were carried out under substantially identical conditions but with the exception that the tellurium dioxide content of the catalysts differed. Each catalyst contained 20% by weight of silica and was prepared by the method substantially as described above. The amount of propylene charge converted to acrolein was determined for each run. Plotting the conversion of propylene to acrolein against tellurium dioxide content of the catalyst resulted in the Curve B of the graph in FIGURE I of the attached drawing.

Example III

The catalyst compositions of foregoing Example I were retested under different operating conditions as follows: In each test a gaseous mixture containing 13% propylene, 13% oxygen, 20% water vapor and 54% argon by volume was passed over a bed of one of the catalysts of foregoing Example I, consisting essentially of molybdenum oxide ($MoO_3$) in combination with tellurium dioxide ($TeO_2$), at a temperature of about 490° C., atmospheric pressure, and a gas hourly space velocity of 4,500. All tests of this series were carried out under substantially identical conditions but with the exception that the content of tellurium dioxide in the catalyst was different for each run. One run was made with a molybdenum oxide catalyst ($MoO_3$) containing no tellurium. Conversion of propylene charged to acrolein was determined for each run and plotted against the tellurium dioxide content of the catalyst. The curve so obtained, is shown as Curve C in the FIGURE I of the attached drawing.

*Example IV*

To show the effect of $TeO_2$ content on the selectivity of the reaction, data obtained in the tests of Example III are replotted in Curve D of FIGURE II of the attached drawing. Also determined for each run was the selectivity to acrolein. Plotting the selectivity against the tellurium dioxide content of the catalyst results in Curve E of FIGURE II of the attached drawing. Selectivity is here defined as moles of acrolein per 100 moles of propylene consumed.

*Example V*

A catalyst was prepared by mixing 4 g. $TeO_2$ powder, 33 g. colloidal silica sol containing 31% by weight $SiO_2$, and a solution of 42.3 g. molybdic acid (85% $MoO_3$) in 250 ml. 1.5 N ammonium hydroxide. The slurry was concentrated and evaporated to dryness. The dried catalyst was calcined in air at 420° C. for 4 hours, and was then broken and sieved to 10-20 mesh granules. This catalyst contained 8% $TeO_2$ and 20% $SiO_2$, based on the total composition or 10% $TeO_2$ basis for $TeO_2$—$MoO_3$ portion thereof. It was tested at 500° C. and atmospheric pressure with a feed containing 10% $C_3H_6$, 10% $O_2$, 20% $H_2O$, and 60% argon, by volume. At a GHSV of 6,000 the conversion of oxygen was 99%, conversion of propylene was 66%, and selectivity to acrolein, basis propylene consumed was 75.

*Example VI*

A catalyst was prepared by mixing 21.5 g. tungstic acid powder and 5 g. $TeO_2$ powder. The mixture was compressed to one-inch diameter tablets at 8,000 pounds pressure and was calcined in air at 420° C. for 2 hours. The tablets were broken and sieved to 10-20 mesh granules. The resulting catalyst contained approximately 20% $TeO_2$. When it was tested at 425° C. and atmospheric pressure with a GHSV of 4,500 of feed containing 13% $C_3H_6$, 13% $O_2$, 20% $H_2O$, and balance argon, conversion of propylene was 56% and selectivity to acrolein was 71. Minor amounts of acrylic acid were also produced, along with $CO_2$, CO and other by-products.

*Example VII*

A catalyst was prepared by dissolving 26.6 g. crude niobium pentoxide in 40 g. of 48% HF solution and 150 ml. water, adding 170 ml. of 6 N ammonium hydroxide, filtering, washing the resulting filter cake and mixing in 1.33 g. $TeO_2$ powder. The mixture was then dried, calcined at 500° C. for 2 hours, and sieved to 10-20 mesh granules. The resulting catalyst consisting essentially of niobium-tellurium-oxygen was tested at 2,250 GHSV, 450° C., and atmospheric pressure with a feed identical to that used in Example VI. Conversion of propylene was 16% and selectivity to acrolein was 41.

*Example VIII*

A catalyst containing 10% $TeO_2$ and 90% bismuth molbdate (atomic ratio Bi:Mo=1.2) was prepared by mixing the tellurium oxide and bismuth molybdate in powder form with water to a thick paste, drying, and calcining at 400° C. for 2 hours. The bismuth molybdate had been prepared by addition of aqueous acidic bismuth nitrate solution (0.5 molal) to an aqueous solution of ammonium molbdate (0.4 molal); then ammonium hydroxide was added to a pH of 5.5, and the resulting precipitate was washed, dried, and calcined at 500° C.

A feed mixture containing 13% by volume propylene, 13% oxygen, 20% steam, and the balance argon, was passed over the tellurium-bismuth molybdenum catalyst at 400° C. and atmospheric pressure. At a GHSV of 2,250, the conversion of propylene was 32%, and the selectivity to acrolein was 89%. This example shows an excellent selectivity at a low operating temperature. The temperature cited here, as in other examples, is the maximum catalyst temperature.

We claim as our invention:

1. The process for the oxidative conversion of an olefin selected from the group consisting of propylene and isobutylene to an alpha-beta-unsaturated aldehyde selected from the group consisting of acrolein and methacrolein which consists essentially of reacting said olefin with oxygen, at a temperature of from about 375 to about 450° C., in the presence of a catalyst consisting essentially of an oxide of a metal selected from the group consisting of molybdenum and tungsten in combination with from about 5 to about 25% by weight of the total catalyst of tellurium dioxide, and maintaining the tellurium dioxide content of said catalyst within said range of from about 5 to about 25% by weight of said total catalyst throughout the course of the reaction.

2. The process for the production of acrolein which consists essentially of reacting propylene with oxygen at a temperature of from about 375 to about 450° C. in the presence of a combination catalyst consisting essentially of molybdenum oxide in combination with from 7.5 to about 18% by weight of tellurium dioxide.

References Cited by the Examiner

UNITED STATES PATENTS 2,669,586    2/54    Middleton _____ 260—604

LEON ZITVER, *Primary Examiner.*

CHARLES B. PARKER, *Examiner.*